Patented Nov. 6, 1928.

1,690,166

UNITED STATES PATENT OFFICE.

HAROLD GRAY, OF AKRON, OHIO, ASSIGNOR TO THE B. F. GOODRICH COMPANY, OF NEW YORK, N. Y., A CORPORATION OF NEW YORK.

LIQUID SOLUTION OF THIOCARBANILIDE.

No Drawing.  Application filed April 28, 1927. Serial No. 187,416.

This invention relates to a composition of matter comprising thiocarbanilide in liquid solution and has for an object to produce a solution of the character indicated which will contain a higher percentage of thiocarbanilide than heretofore obtainable and for which the thiocarbanilide will not be permanently separated out at low temperatures.

Thiocarbanilide has been restricted in its uses in the industrial arts largely because of the fact that it is difficultly soluble in the common and commercially available solvents. For certain purposes it has been heretofore proposed to dissolve thiocarbanilide with orthotoluidine which however is able to hold in solution at normal temperatures but from 3 to 4% of this material and from which solution it is readily crystallized out as the temperature is lowered.

The purpose of the present invention is to provide a composition comprising thiocarbanilide in solution which will contain relatively high percentages of thiocarbanilide and from which solution the thiocarbanilide will not be separated or crystallized out upon lowering the temperature to 0° C. or lower.

Experiments have shown that the amines are solvents for thiocarbanilide only to a small degree, aniline being capable of dissolving from 2 to 3% of thiocarbanilide at ordinary temperatures. I have discovered however that if two or more distinctly different amines are admixed and employed as a solvent for thiocarbanilide that a greatly increased percentage of thiocarbanilide may be maintained in solution than any one of these amines singly will maintain. This remarkable property of a mixture of several amines is analagous to the marked change in melting points which is brought about by the alloying of a plurality of metals and no explanation of the principle underlying this phenomenon has been determined. In general, I have found that an admixture of a monamine and a diamine give the most satisfactory results but I also find that admixtures of two or more distinctly different monamines are also efficient solvents for thiocarbanilide. I have also found that at least one of the amines should be a liquid at normal temperatures and that an admixture of a liquid and solid amine is capable of dissolving and holding in solution larger percentages of thiocarbanilide than is the liquid amine alone. A wide variety of amines may however be employed as will be evident from the more detailed description hereinafter given.

The following specific examples are illustrative of the general principles hereinabove set forth:

*Example 1.*—A liquid solution of thiocarbanilide was prepared by admixing together 33⅓ parts by weight of aniline, 26⅔ parts by weight of dimethyl para-phenylene diamine and 40 parts of thiocarbanilide. The admixture is heated on a steam bath, or otherwise, at temperatures ranging from 100° C. to 120° C. until a complete solution is obtained, the time of heating depending upon the size of the batch treated and generally ranging from 1 to 2 hours, altho shorter times are sufficient with very small batches. When a clear solution is obtained the heat may be withdrawn. The resulting product is a clear, dark brown watery liquid at normal temperatures. This liquid does not lose its fluidity at low temperatures, even at −40° C. to −50° C. and may be poured from a receptacle at this temperature. It does however become somewhat mushy at these extremely low temperatures, but it regains its clear liquid characteristics upon the temperature being raised. This is a very important property of this solution since it is important that low temperatures encountered in shipping during the winter season should not cause the thiocarbanilide to be permanently separated out of solution, as is the case with orthotoluidine solutions of thiocarbanilide heretofore employed.

*Example 2.*—A composition capable of remaining liquid even at the low temperatures hereinabove referred to has been prepared from the following ingredients: Thiocarbanilide 60 parts by weight; dimethyl paraphenylene diamine 20 parts; aniline 50 parts; xylidine 30 parts. These materials are admixed and heated as in the previous example. The product at normal temperatures is a clear dark brown liquid having the appearance of the solution of the prior example. Upon reducing the temperature to below zero, even as low as −40° C. to −50° C., the material, altho viscous, still retains its liquid characteristics.

*Example 3.*—In the previous example monamines and diamines have been conjointly employed in the preparation of the thiocarbanilide solutions. I find however that admixtures of monamines also produce similar compositions. Thus, 25 parts by weight of thiocarbanilide, 30 parts of aniline, 30 parts of orthotoluidine and 15 parts of paratoluidine were admixed and subjected to heat at temperatures ranging from 80° C, to 100° C. until a clear liquid solution was formed. As in the previous examples, the time of heating varies with the size of the batch. Continued heating after the materials are completely liquefied is not however detrimental to the resulting product and may in certain cases be beneficial. There is formed in this process a clear brownish liquid from which the thiocarbanilide does not separate out even at extremely low temperatures.

The preceding specific examples are sufficient to illustrate the principles of the present invention which however is not restricted either to the substances mentioned or to the proportions given. Thus, it has been found that the proportions of the above examples may be widely varied and that wherever two or more of the amines are admixed together in any proportion they have a greater solvent capacity for thiocarbanilide than does either of the amines alone. Moreover, other combinations of amines may be employed as solvents for thiocarbanilide. Thus, xylidine may replace the aniline of Example 1 and the following amines have been employed in varying proportions and in numerous combinations of the character hereinabove described to give satisfactory solutions: pyridine, a-naphthylamine, p-phenylene diamine, m-toluene diamine, and m-phenylene diamine.

The above indicated compositions of matter comprising solutions of thiocarbanilide and amines are useful in the industrial arts in numerous operations but particularly as flotation reagents in the separation of metals from the ore pulp in the flotation processes commonly employed to effect this result. Where used for this purpose, they have the advantage of containing a much higher percentage of the active flotation reagent, namely thiocarbanilide, preferably of the order of from 25 to 40 per cent, than solutions of thiocarbanilide heretofore available and the further property that the thiocarbanilide will not permanently separate out from the solution when the material is exposed to extremely low temperatures a condition commonly encountered during the shipment and the storage of such materials.

It will be obvious that numerous variations and modifications not herein indicated may be made in the compositions herein described without departing from the principles of this invention, and I therefore do not purpose wholly to limit the scope of the claims hereto appended except as may be necessitated by the prior art.

I claim:

1. A composition of matter comprising a liquid solution of thiocarbanilide and a plurality of different amines.

2. A composition of matter comprising a liquid solution of thiocarbanilide, a monamine and a diamine.

3. A composition of matter comprising a liquid solution of thiocarbanilide and two different amines, one of which is a liquid.

4. A composition of matter comprising a liquid solution of thiocarbanilide and two or more amines of different empirical formulas, at least one of which is a liquid.

5. A composition of matter comprising a solution of thiocarbanilide and three amines, one of which is a liquid.

6. A composition of matter comprising thiocarbanilide, a liquid monamine and a diamine.

7. A composition of matter comprising thiocarbanilide and two or more different amines, at least one of which is a liquid monamine.

8. A composition of matter comprising thiocarbanilide and a plurality of amines including a liquid monamine and dimethyl paraphenylene diamine.

9. A composition of matter comprising thiocarbanilide and a plurality of amines including aniline and a diamine.

10. A composition of matter comprising thiocarbanilide and a plurality of amines including aniline and dimethyl para-phenylene diamine.

11. A composition of matter comprising thiocarbanilide and a plurality of amines including xylidine.

12. A composition of matter comprising thiocarbanilide and a plurality of amines including xylidine and a diamine.

13. A composition of matter comprising thiocarbanilide and a plurality of amines including xylidine and dimethyl para-phenyl diamine.

14. A composition of matter comprising thiocarbanilide and a plurality of amines including aniline, xylidine and a diamine.

15. A composition of matter comprising thiocarbanilide and a plurality of amines including aniline, xylidine and dimethyl paraphenylene diamine.

16. A composition of matter comprising a clear liquid solution at normal temperatures of thiocarbanilide and a plurality of different amines, which solution retains its fluidity at temperatures somewhat below 0° C.

17. A composition of matter comprising a clear liquid solution at normal temperatures of thiocarbanilide and a plurality of different amines, from which solution thiocarbanilide is not permanently separated out at temperatures somewhat below 0° C.

18. As a new composition of matter a clear liquid solution of thiocarbanilide and a plurality of different amines containing 25 to 40 per cent of thiocarbanilide at normal temperatures.

19. As a new composition of matter, a clear liquid solution of thiocarbanilide and a plurality of different amines containing 25 to 40 per cent of thiocarbanilide in solution at 0° C.

20. As a new composition of matter, a fluid admixture of thiocarbanilide and a plurality of amines containing from 25 to 40 per cent of thiocarbanilide at normal temperatures.

In witness whereof I have hereunto set my hand this 20th day of April, 1927.

HAROLD GRAY.